C. F. BURGESS.
BATTERY HAND LAMP.
APPLICATION FILED MAR. 1, 1916.
1,299,908.
Patented Apr. 8, 1919.
2 SHEETS—SHEET 1.
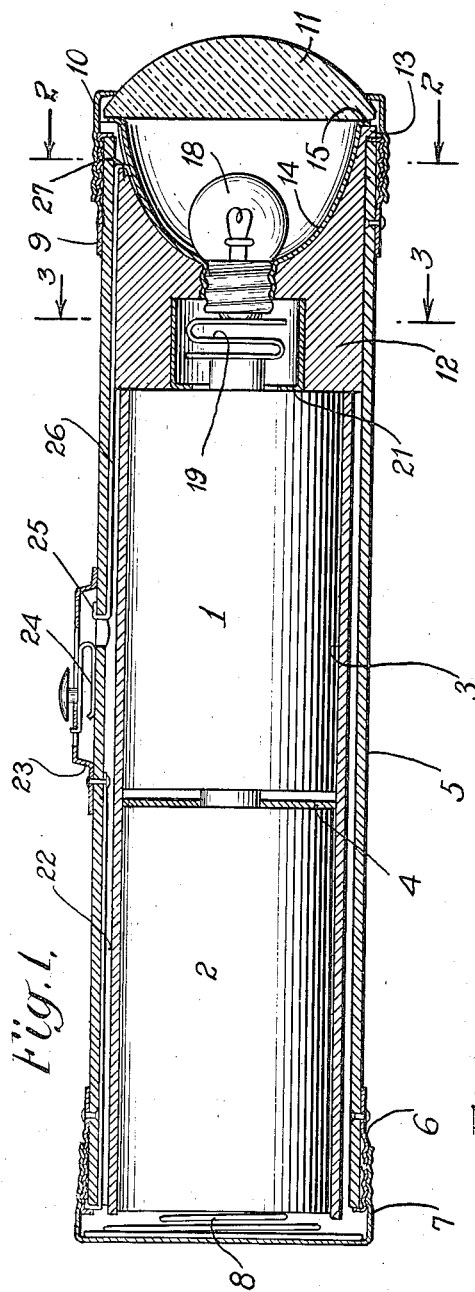
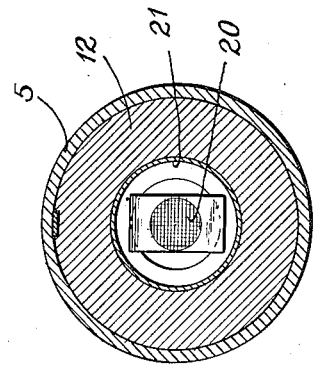
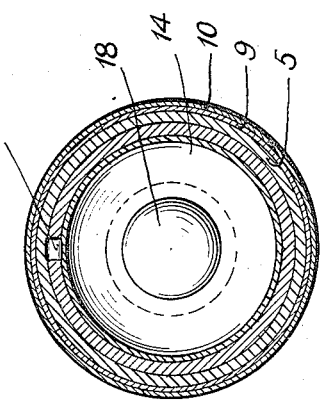
INVENTOR
Charles F. Burgess
BY
Pennie Davis & Marvin
ATTORNEYS

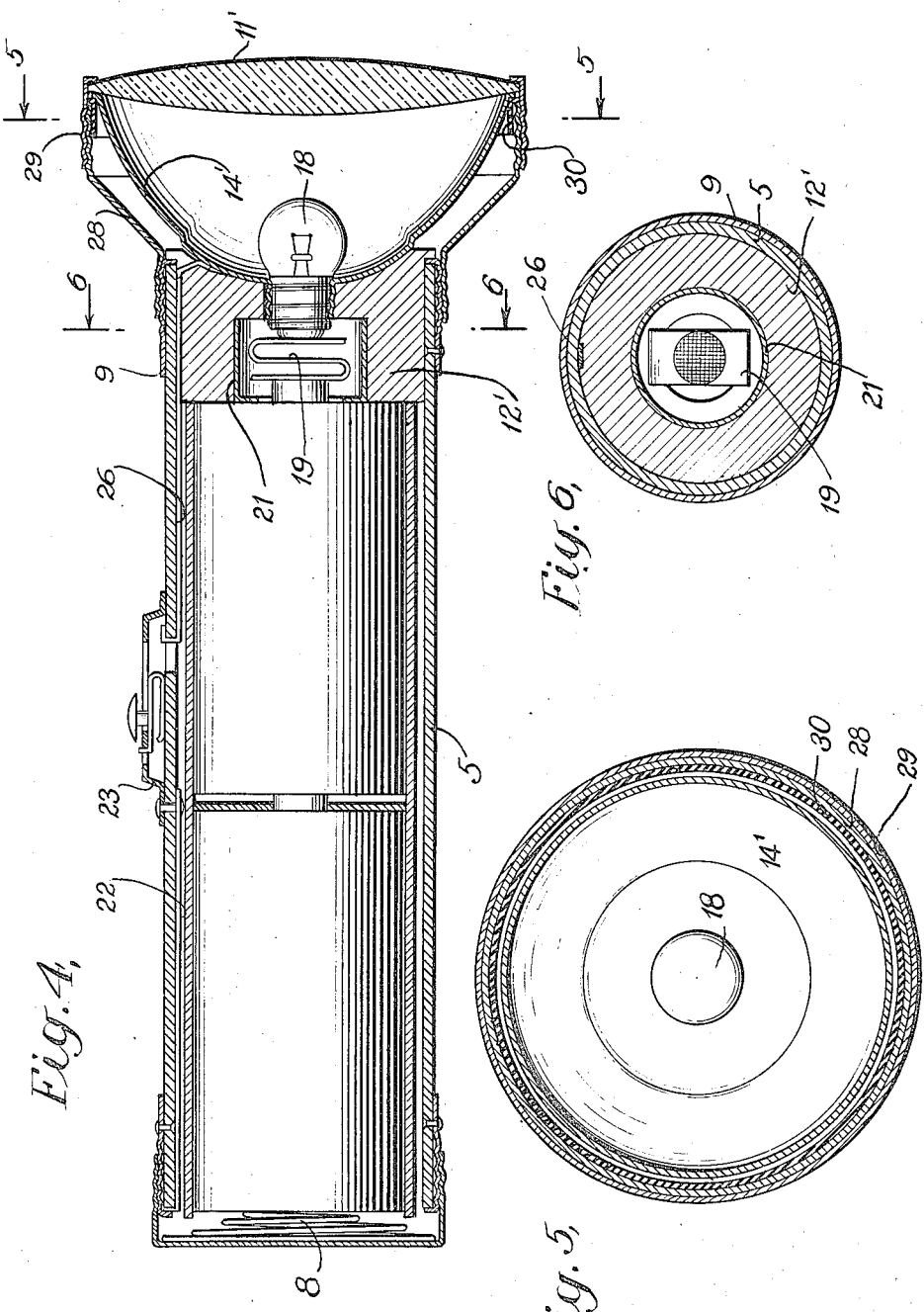

UNITED STATES PATENT OFFICE.

CHARLES F. BURGESS, OF MADISON, WISCONSIN, ASSIGNOR, BY MESNE ASSIGNMENTS, TO BURGESS BATTERY COMPANY, OF MADISON, WISCONSIN, A CORPORATION OF WISCONSIN.

BATTERY HAND-LAMP.

1,299,908.   Specification of Letters Patent.   Patented Apr. 8, 1919.

Application filed March 1, 1916. Serial No. 81,301.

*To all whom it may concern:*

Be it known that I, CHARLES F. BURGESS, a citizen of the United States, residing in Madison, county of Dane, State of Wisconsin, have invented certain new and useful Improvements in Battery Hand-Lamps; and I do hereby declare the following to be a full, clear, and exact description of the invention, such as will enable others skilled in the art to which it appertains to make and use the same.

The present invention relates to battery hand lamps or flash lights of a type adapted for carrying in the pocket and provided with a miniature lamp to which current may be delivered from a battery inclosed in the casing of the device. It has been found in practice that when these hand lamps are dropped there is danger that the batteries will crash through the base of the incandescent lamp and destroy it, and this is particularly the case when the battery is supported at its base on a coiled contact spring, for the spring permits enough movement of the battery in the case to give a relatively heavy blow when the battery strikes the lamp at the other end of the case. In many hand lamps of usual construction there is also danger of crushing the lamp by screwing on the bottom cap of the device so tightly as to crowd the batteries forcibly against the base of the lamp and in the same way the carbon electrode of a battery cell may be subjected to such pressure as to fracture the sealing material and force the electrode down into its container.

It is an object of the present invention to protect the lamp from fracture because of too much pressure on its base, whether this results from the impact of the battery thereon when the device is dropped, or results from the forcible crowding of the lamp and battery against one another. To attain this object I make use of a bumper block in the casing in such a way that it takes the direct thrust of the batteries and limits the pressure of contact on the base of the lamp. This bumper block also shields the upper carbon electrode from undue pressure.

It is a further object of the present invention to provide means of the general character disclosed in my Patent No. 1,084,926, issued January 20, 1914, for protecting the lamp against accidental lighting, by so inclosing certain parts of the electrical connections that accidental contact across the exposed metal parts of the device will not be effective to light the lamp. By making the impact block above referred to of insulating material and by suitably arranging it in the end of the casing, it can serve the further function of supporting certain of the conductive elements, notably the lamp reflector, and will keep these elements out of contact with other metal parts through which current might otherwise flow to accidentally light the lamp.

For a more complete understanding of these and other objects and advantages of the invention, reference is made to the following description which is to be taken in conjunction with the accompanying drawings, wherein.

Figure 1 is a sectional elevation of a tubular hand lamp,

Fig. 2 is a transverse cross-section on the line 2—2,

Fig. 3 is a similar section on the line 3—3,

Fig. 4 is a longitudinal section of a modified form,

Fig. 5 is a transverse section on the line 5—5, and

Fig. 6 is a similar section on the line 6—6.

In the embodiment illustrated in Figs. 1 to 3 inclusive, a pair of battery cells 1 and 2, or other suitable number, are arranged end to end in usual manner within a pasteboard tube 3. Interposed between the cells is a paraffined washer 4 which serves to protect the lower cell in case of failure of its seal and leakage of its electrolyte and in case through accident the central or carbon electrode of the cell is forced down through the sealing material so that except for the washer the cell would be shortcircuited through the zinc of the cell immediately above.

The battery is housed in a casing 5 here illustrated as comprising a tube of insulating material, preferably fiber, reinforced at its rear or bottom end with a threaded metal collar 6 to which is detachably secured an end cap 7 provided with a spiral spring 8 which bears against the naked bottom of the lowermost cell of the battery to establish electrical connection therewith.

The other end of the tubular casing is reinforced with an exposed metal collar 9 having its outer edge bent inward to overlap the front end of the insulating tube and having a screw thread pressed therein for engagement with a threaded lens holder 10 which may be of metal and shaped to engage the edge of a glass lens 11.

Within the front end of the tubular battery casing is a bumper block 12 consisting of insulating material and preferably having its front edge shaped to form a flange 13 which overlaps the end of the casing and covers up the inturned edge of metal collar 9. This bumper block is recessed to receive a metal reflector 14 and the front edge of the reflector may be bent outward at 15 to overlie the flange of the bumper block without, however, extending outward far enough to contact with the metal lens holder 10. An incandescent lamp 16 is threaded into a tubular extension of the metal reflector and has its base projecting down into an enlarged recess in the bumper block where the central terminal of the lamp may engage a spring 19 between the lamp and the central or carbon terminal of the topmost battery cell. Spring 19 preferably consists of a strip of metal shaped to approximate the form of the letter S and having its top and bottom faces roughened as at 20, Fig. 3, to insure good electrical contact with the battery terminal and with the lamp terminal.

As a means for preventing accidental displacement of the spring 19 while permitting some movement and adjustment thereof within the bumper block, there is provided a metal thimble 21 fitted into the enlarged recess of the bumper block and provided with a flange serving as a guard to prevent accidental escape of spring 19.

With the parts assembled as above described, the battery is held against the bumper block 12 by the coiled spring 8, and the spring 19 establishes electrical connection to the lamp but limits the pressure to which the base of the lamp is subjected. If the device is dropped, the battery can oscillate in the casing without subjecting the lamp to destructive impact and similarly a too tight adjustment of the bottom cap 7 is without injurious effect on the lamp and can not crush the upper carbon electrode through its sealing material and into battery cell 1.

As a means for establishing electrical connection from the bottom of the battery to the lamp I make use of a conductor 22 contacting with metal collar 6, and, therefore, connected with spring 8. This conductor 22 is riveted to a housing 23 mounted near the middle of the tubular casing and may be provided with a sliding contact device of the type disclosed and claimed in the patent to Maisel, No. 1,082,887, issued December 30, 1913. This device comprises a U-shaped strip of resilient metal having its inner leg 24 arranged to slide along the outer face of the fiber tube into and out of contact with a lug 25. Other well known devices of proper construction may, of course, be used for completing the connection between conductor 22 and lug 25. This lug consists of the clenched end of a metal strip 26 which extends along the side of the insulating tube between it and the bumper block 12 and has its front end 27 bent over and lying against reflector 14 to establish electrical connection therewith.

With this arrangement of circuits, the outer terminal of lamp 18 is electrically connected with reflector 14 and conductor 26, but normally is insulated from all other parts of the device and particularly is insulated from all exposed metal parts, and consequently an accidental lighting of the lamp by bridging its exposed metal parts is not possible.

To renew the batteries it is only necessary to unscrew cap 7 for the batteries may then be slipped out and new ones put in their place, and even though the new ones be dropped in carelessly, they can not strike a hard blow against the lamp base but will be stopped by the bumper block 12 against which the battery container bears when the central electrode enters the recess in the bumper block. Other parts of this structure are also easily accessible, for by unscrewing the lens holder, the lens and the reflector and its lamp may be taken out and then by bending up the hooked end 27 of the conductor 26 the impact block and its spring 19 may be withdrawn through the front end of the casing.

In the modification illustrated in Figs. 4 to 6 wherein like parts are numbered to correspond to Fig. 1, the collar 9 on the front end of the casing has threaded engagement with a flaring collar 28 and the latter, together with a flanged member 29, serves to hold lens 11' and reflector 14' to their seats. Reflector 14' is seated in the recessed front face of the bumper block 12', and has its outer edge insulated from the adjacent metal parts 28 and 29 by means of a fiber ring 30 provided with an outwardly extending flange which lies over the outer edge of collar 28 and forms a seat against which the edges of the reflector and of the lens may be clamped.

The operation of this modification, together with its advantages, will be clear from the foregoing description of the device shown in Fig. 1.

I claim:

1. In a tubular hand lamp, the combination of an insulating casing, a battery therein, a spring pressing against the bottom of said battery to establish electrical connection therewith, a lens and a reflector at the other end of said casing, a lamp secured in said reflector, a bumper in said casing between the battery and the reflector to receive the thrust of the battery, a spring connecting one terminal of said battery to said lamp, and means for completing the connection between said bottom spring and said lamp.

2. In a tubular hand lamp, the combination of an insulating casing, a battery therein, a spring pressing against the bottom of said battery to establish electrical contact therewith, a lens and a reflector closing the other end of said casing, a lamp threaded into said reflector, a bumper in said casing to receive the thrust of the battery, a spring in said bumper for connecting the inner terminal of said battery to said lamp, a contact device on the side of said casing for controlling the flow of current in said lamp, and conductive longitudinal strips leading from said contact device to said reflector and to said first named spring.

3. In a tubular hand lamp, the combination of a casing, a battery therein, a lens at the front end of said casing, a reflector and a bumper block clamped between said lens and the end of said casing, and a lamp mounted in said reflector, the casing of said battery being seated against said bumper block, and said block having a recess wherein the central terminal of said battery is received; substantially as described.

4. In a hand lamp, the combination of a tubular fiber casing, a battery therein, a reflector at the front end of said casing, a lamp for said reflector, a bumper protecting said lamp against the impact of said battery, a lens and lens support which clamps said bumper against the end of said casing, a switch mechanism on the side of the casing and a stationary conductive strip for conveying current from said switch mechanism to said lamp.

5. In a hand lamp, the combination of a tubular casing, a battery therein, a lamp, reflector and lens at the front end of said casing, an insulating block against which the battery container seats, said block having a flange, means for clamping said flange against the end of said casing, said block having a central recess wherein one terminal of the battery is received, and a leaf spring within said recess to establish connection between a battery terminal and the central terminal of said lamp.

6. In a hand lamp, the combination of a tubular casing, a battery therein, a reflector and lens at the front end of said casing, a lamp in said reflector, an insulating bumper block, means for securing said bumper block in the front end of said casing, a central recess in said block, a spring therein to establish connection between a battery terminal and the central terminal of said lamp, and a guard encircling said recess to prevent accidental displacement of said spring.

7. In a hand lamp, the combination of a tubular casing, a lens and a reflector therefor, a lamp threaded into said reflector, an insulating bumper having a flange, means engaging said flange and securing said bumper in the end of said casing, said bumper having a central recess, and an S-shaped leaf spring in said recess for connecting a battery terminal to the central terminal of the lamp.

8. In a hand lamp, the combination of an insulating tube of fiber, a battery therein, a threaded metal collar reinforcing the rear end of said tube, a cap threaded to said collar and closing the rear end of said tube, said cap being removable to permit removal of the battery through said rear end, a spring carried by said cap and engaging the bottom of said battery and establishing electrical connection therewith and with said cap, a lamp connected to the other end of said battery, a reflector into which said lamp is threaded, said reflector having a peripheral flange, a threaded metal collar reinforcing the front end of said tube and having an inturned flange, insulating means spacing said flanges from one another, a lens for said lamp seated on said reflector flange and a holder for said lens threaded to said flanged collar and clamping said reflector and its insulating means in position, and conductive means insulated from said flanged collar and from said lens holder and controllable from approximately the center of said tube for electrically connecting said end cap to said reflector when the lamp is to be lighted.

9. In a hand lamp, the combination of an insulating tube, a battery therein, a threaded metal collar reinforcing the rear end of said tube, a cap threaded to said collar and closing the rear end of said tube, said cap being removable to permit removal of the battery through said rear end, a spring carried by said cap and engaging the bottom of said battery and establishing electrical connection therewith, a lamp connected to the other end of said battery, a reflector into which said lamp is threaded, said reflector having a peripheral flange, a threaded metal collar reinforcing the front end of said tube, removable insulating means spacing said reflector flange from adjacent metal parts, a lens for said lamp seated on said reflector flange and a holder for said lens clamping said reflector and its insulating means in position, and conductive means insulated from said lens holder and controllable from approximately the center of said tube and electrically connecting said spring to said reflector when the lamp is to be lighted.

10. In a hand lamp, the combination of a tubular insulating casing, a battery in said casing, a detachable cap closing the rear end of said casing by the removal of which said battery may be withdrawn through said rear end, a spring carried by said cap and engaging the bottom of said battery and establishing electrical connection therewith and with said cap, a lamp connected with the other end of said battery, a threaded member wherein said lamp is supported, a lens for said lamp, a metal collar reinforcing the front end of said insulating casing, supporting means for said lens secured to said collar, insulating means removably seated on the front end of said tubular casing and spacing said lamp supporting member from adjacent exposed metal parts to prevent accidental lighting of the lamp through accidental connection with those parts, a conductor contacting with said threaded member and insulated from all exposed metal parts and conductive means insulated from said lens support and electrically connecting said spring with said conductor when the lamp is to be lighted.

11. In a hand lamp, the combination of a tubular insulating casing, a battery in said casing, a detachable cap closing the rear end of said casing by the removal of which said battery may be withdrawn through said rear end, a spring carried by said cap and engaging the bottom of said battery and establishing electrical connection therewith, a lamp connected with the other end of said battery, a conductive member wherein said lamp is seated, a lens for said lamp, a metal collar reinforcing the front end of said insulating casing, supporting means for said lens secured to said collar, said conductive member being insulated from said lens-supporting means and from all exposed metal parts to prevent accidental lighting of the lamp through accidental connection of exposed metal parts, and conducting means insulated from said metal collar and from said lens supporting means and electrically connecting said spring with said conductive member when the lamp is to be lighted, said conducting means including a metal strip having its front end bent inward to engage the conductive member wherein said lamp is seated.

12. In a hand lamp, the combination of a tubular insulating casing, a battery in said casing, a detachable cap closing the rear end of said casing and by the removal of which said battery may be withdrawn through said rear end, a spring carried by said cap and engaging the bottom of said battery and establishing electrical connection therewith, a lamp connected with the other end of said battery, a conductive member into which said lamp is threaded. a lens for said lamp, a metal collar on the front end of said insulating casing, supporting means for said lens secured to said collar, insulating means encircling said conductive member and held in position by said lens-supporting means, said insulating means spacing said conductive member from adjacent metal parts to prevent accidental lighting of the lamp through accidental connection with those parts, and conductive means insulated from said metal collar and electrically connecting said spring with said conductive member when the lamp is to be lighted, said means including a conductor insulated from all exposed metal parts, said means also including a thumb piece mounted on said casing and movable to establish connection with said conductor whereby the battery circuit is controlled.

13. In a tubular hand lamp, the combination of a casing having an exposed metal end, a battery therein, a spring pressing against the bottom of said battery to establish electrical contact therewith, a lens and a reflector at the other end of said casing, a lamp for said reflector, a bumper contacting with said reflector to relieve the inner lamp terminal of undue pressure from the battery, a spring establishing a battery connection to the inner terminal of the lamp, and stationary conductors with an intervening switch forming contact means for completing the connection between said battery and said lamp.

14. In a tubular hand lamp, the combination of an insulating casing, a battery therein, a spring pressing against the bottom of said battery to establish electrical connection therewith, a reflector at the other end of said casing, a lamp secured in said reflector, an insulating bumper block secured to said casing and having a recess within which a battery terminal is received, a spring within said recess and connecting the inner terminal of said battery to said lamp, contact means for completing the connection between said battery and said lamp, a lens for said lamp, and a detachable lens holder securing said lens to said casing, said bumper block being positioned to insulate said reflector from adjacent metal parts to prevent accidental lighting of the lamp through accidental connection of exposed metal parts of the device.

15. In a tubular hand lamp, the combination of an insulating casing, a battery therein, a spring pressing against the bottom of said battery to establish electrical connection therewith, a reflector at the other end of said casing, a lamp secured in said reflector, an insulating bumper secured to said casing, a spring connecting the inner terminal of said battery to said lamp, stationary conductive strips provided with a switch for completing the connection between said battery and said lamp, a lens for said lamp and a detachable lens holder securing said lens to said casing, said bumper being in position to insulate said reflector from adjacent metal parts to prevent accidental lighting of the lamp through accidental connection of exposed metal parts of the device.

16. In a tubular hand lamp, the combination of an insulating casing, a battery therein, a spring pressing against the bottom of said battery to establish electrical connection therewith, a lens and a lamp support at the other end of said casing; a lamp threaded into said support, means for holding said lens and support in position, an insulating bumper in said casing and separating said support from adjacent metal parts, a spring in said bumper for connecting the inner terminal of said battery with said lamp, and stationary strips and an intervening switch forming contact means for controlling the flow of battery current through said lamp.

17. In a hand-lamp, the combination of a tubular insulating casing, a metal collar on the front end thereof, a battery in said casing, a lamp and reflector at the front end of said casing, a cap closing the other end of said casing and provided with a spring engaging the bottom of said battery to establish electrical connection therewith, a contact device near the center of said casing, conductors leading from said contact device to said reflector and to said spring, respectively, a lens for said lamp, and a lens support threaded to said collar and enveloping said reflector and insulated therefrom to prevent accidental lighting of the lamp through accidental connection of exposed metal parts.

18. In a hand-lamp, the combination of a tubular casing having a metal end, a battery in said casing and removable through either end thereof, a detachable metal cap closing the rear end of said casing, by the removal of which said battery may be withdrawn through said rear end, a spring carried by said cap and engaging the bottom of said battery and establishing electrical connection therewith, a lamp connected with the other end of said battery, a conductive member wherein said lamp is seated, a lens for said lamp, supporting means for said lens secured to said metal casing end, said conductive member being insulated from said lens-supporting means, a switch near the center of said casing, and a stationary conductive strip leading from said switch to said conductive member, said strip being insulated from said metal end and from said lens holder.

In testimony whereof I affix my signature.

CHARLES F. BURGESS.